(12) United States Patent
Qian et al.

(10) Patent No.: US 8,473,276 B2
(45) Date of Patent: Jun. 25, 2013

(54) UNIVERSAL LANGUAGE INPUT

(75) Inventors: Jiang Qian, Pittsburgh, PA (US); Lei Zhang, Beijing (CN)

(73) Assignee: Google Inc., Mountain View, CA (US)

( * ) Notice: Subject to any disclaimer, the term of this patent is extended or adjusted under 35 U.S.C. 154(b) by 901 days.

(21) Appl. No.: 12/033,697

(22) Filed: Feb. 19, 2008

(65) Prior Publication Data

US 2009/0210214 A1    Aug. 20, 2009

(51) Int. Cl.
*G10L 15/18* (2006.01)
(52) U.S. Cl.
USPC .............. 704/2; 704/3; 704/8; 715/264
(58) Field of Classification Search
USPC .................................................. 704/2, 3, 8
See application file for complete search history.

(56) References Cited

U.S. PATENT DOCUMENTS

| | | | | |
|---|---|---|---|---|
| 5,392,386 | A * | 2/1995 | Chalas | 715/841 |
| 5,594,642 | A * | 1/1997 | Collins et al. | 715/236 |
| 5,974,372 | A * | 10/1999 | Barnes et al. | 704/8 |
| 6,092,036 | A * | 7/2000 | Hamann | 704/8 |
| 7,224,346 | B2 * | 5/2007 | Sheng | 345/171 |
| 7,318,020 | B1 * | 1/2008 | Kim | 704/2 |
| 7,340,388 | B2 * | 3/2008 | Soricut et al. | 704/4 |
| 7,539,619 | B1 * | 5/2009 | Seligman et al. | 704/277 |
| 2001/0029455 | A1 * | 10/2001 | Chin et al. | 704/277 |
| 2005/0021322 | A1 * | 1/2005 | Richardson et al. | 704/2 |
| 2005/0086214 | A1 | 4/2005 | Seewald et al. | |
| 2008/0195372 | A1 * | 8/2008 | Chin et al. | 704/2 |

FOREIGN PATENT DOCUMENTS

| | | |
|---|---|---|
| CN | 1421804 A | 6/2003 |
| CN | 101072168 A | 11/2007 |

OTHER PUBLICATIONS

Anonymous: "SDLChat User Guide" [Online] Feb. 3, 2007, XP002540928, Retrieved from the Internet: URL:http://web.archive.org/web/20070203013423/http://www.chattranslator.com/pdfs/user_guide.pdf> [retrieved on Aug. 11, 2009], 9 pages.
European Examiner Justin Woods, Notification of Transmittal of the International Search Report and the Written Opinion of the International Searching Authority, or the Declaration for Application No. PCT/US2009/033834, dated Aug. 26, 2009, 11 pages.

* cited by examiner

*Primary Examiner* — Vincent P Harper
(74) *Attorney, Agent, or Firm* — Remarck Law Group PLC (57) ABSTRACT

Systems, methods, and apparatuses including computer program products for universal language input are provided. In one implementation, a method is provided. The method includes using a first application or operating system component to detect user input to an application interface of a second application. The method also includes, as input is detected in the application interface, automatically using the first application to provide one or more translations of the input including, sending the input to a translation model, receiving translated input from the translation model, and sending the translated input to the application interface of the second application.

2 Claims, 4 Drawing Sheets

UNIVERSAL LANGUAGE INPUT

BACKGROUND

This specification relates to language input methods.

Language input methods allow users to provide language input using an input method editor (IME). The IME is a language input method application that allows an input method to be used. An input method allows a user to provide input in a target language (e.g., a non-Latin language) using a keyboard in a source language (e.g., QWERTY keyboard). The IME maps ideographs of the target language to keys on the keyboard in the source language (e.g., pressing a particular key or combination of keys in an input language produces a corresponding ideograph in the target language according to the mapping). Conventional IMEs, however, simply substitute mapped characters; they do not translate the input (e.g., interpret a meaning of input text in a source language and provide translated text, with a substantially same meaning, in a target language).

If a user would like to provide input in a source language and translate the input into a target language, the user typically uses a separate dictionary or translation application. The user provides input in the source language to the dictionary or translation application. The user then copies translated input (e.g., input translated into the target language) from the dictionary or translation application and pastes the translated input in a desired location. Furthermore, if the user would like to translate separate portions of text (e.g., entering different lines of a chat conversation), the user typically provides each portion of text to the dictionary or translation application. Then, the user copies and pastes each portion of translated text from the dictionary or translation application in a desired location (e.g., in a chat interface).

SUMMARY

Systems, methods, and apparatuses including computer program products for universal language input are provided, in particular, for translating input. In general, in one aspect, a method is provided. The method includes using a first application or operating system component to detect user input to an application interface of a second application. The method also includes, as input is detected in the application interface, automatically using the first application to provide one or more translations of the input including, sending the input to a translation model, receiving translated input from the translation model, and sending the translated input to the application interface of the second application. Other embodiments of this aspect include systems, apparatuses, and computer program products.

Implementations of the aspect can include one or more of the following features. Detecting user input can include applying a hook to an interface, where the interface is operable to communicate with an operating system and one or more applications, and monitoring calls to the interface. The calls can include system calls or application program interface calls. The first application or operating system component can include an input method editor. Providing one or more translations of the input can include presenting the one or more translations in a user interface, and copying a selected translation into a text browser or editor. The selected translation can be identified by a user selection of the one or more translations. The translation model can be located at a remote translation server. The first application can be updated using an update server. The translation model can use a selectable language model.

Particular embodiments of the subject matter described in this specification can be implemented to realize one or more of the following advantages. A universal language input method editor allows a user to automatically translate input text in applications that do not perform translations (i.e., applications that require the use of a separate application to perform the translations), thereby saving the user time and keystrokes. The universal language input method editor can use a remote translation server and an update server, which allows greater translation coverage (e.g., access to additional languages, words, and phrases that are not available in a local translation model). Furthermore, use of a translation server reduces the memory size of an input method editor since components of a translation model can be stored remotely.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
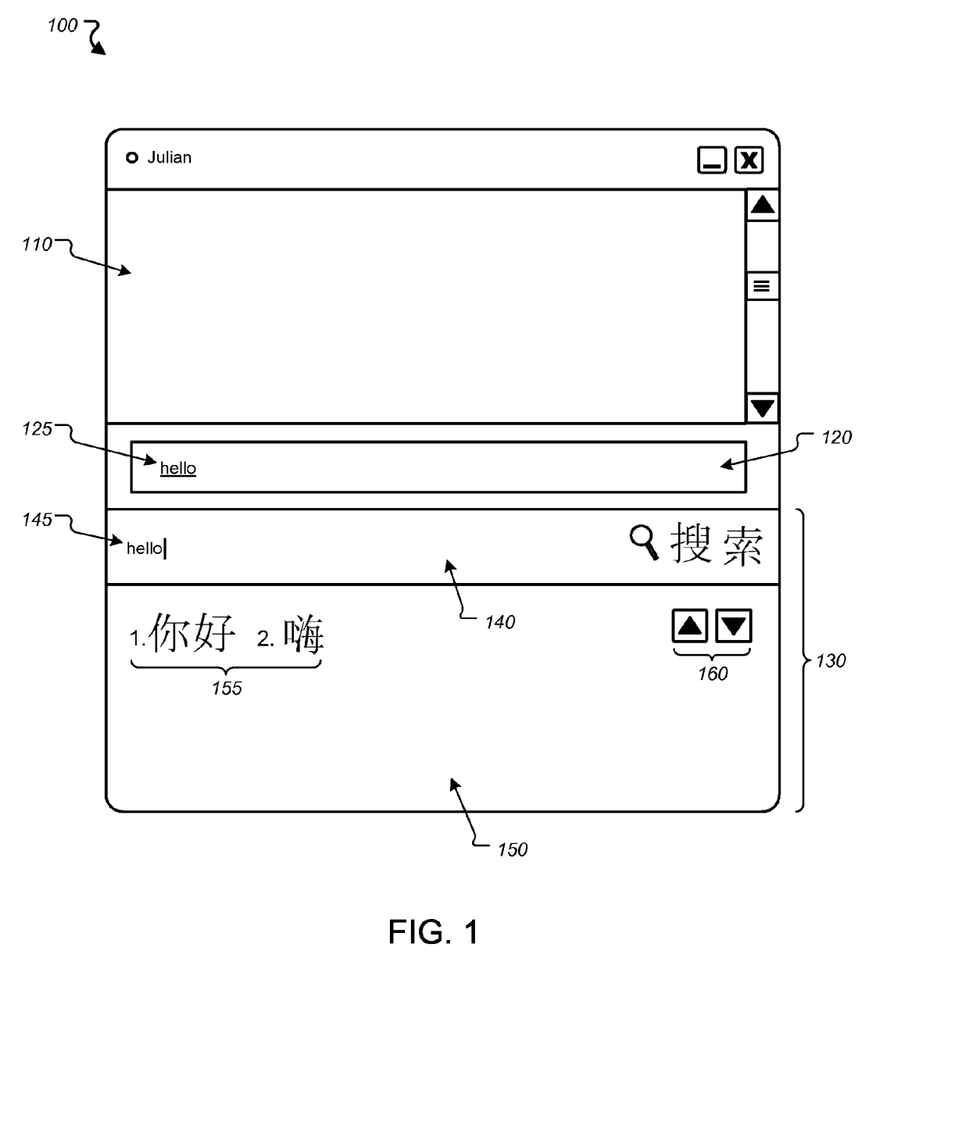
FIG. 1 is an example screenshot of an application interface including received translated input.

FIG. 1 is an example screenshot of an application interface 100 including received translated input 155 (e.g., one or more translations of a user input to the application interface 100). The application interface 100 can be, for example, a text browser or editor (e.g., chat application, word processor, email application, or web browser). In some implementations, the application interface 100 includes a display area 110, a user input area 120, and a translation window 130. The translation window 130 includes a search field 140 ( "搜索" means "search") and a translated input area 150.

For example, the application interface 100 represents a chat window of a chat client application (e.g., Google Talk). The display area 110 displays chat content of chat participants (e.g., text representing lines of dialogue between chat participants, for example, according to the input time). User input area 120 allows a user to browse, input, and edit text to be used as chat content. User input area 120 includes example input to be translated 125 (e.g., "hello"). In some implementations, the input to be translated can be underlined (e.g., example input 125 "hello"), indicating to the user that the input can be replaced by a translation from the translated input 155.

In some implementations, the user provides input to be translated 125 in user input area 120. A universal language input method editor can detect the input and automatically provide one or more translations of the input, as described in FIGS. 2-4. For example, the universal language input method editor can detect "hello" as input, automatically present the input to be translated 125 in the search field 140, and allow the user to continue providing input to be translated 145. The universal language input method editor automatically provides the translated input 155 in the translated input area 150.

In some implementations, the universal language input method editor provides more than one possible translation, for example, when there are multiple ways of translating a given input. For example, the translated input 155 includes a first translation "你好" and a second translation "嗨", which are both Chinese translations of the English word "hello".

In some implementations, the universal language input method editor runs as a background process. For example, the universal language input method editor can run as a background process when an application operable to use an input method editor is running. As another example, the universal language input method editor launches as a background process when the operating system boots up. In particular, the translation window can automatically be presented in a user interface with applications that use input methods. In some implementations, a user directly provides input in the search field 140 for translation.

In some implementations, the universal language input method editor is manually initiated and manipulated by the user. For example, the user can launch the universal language input method editor as a background process. In particular, the universal language input method editor can open a translation window in response to a user toggle (e.g., keyboard shortcut keys and mouse-clicking on a toggle button). In some implementations, display controls 160 allow a user to hide or reveal the translation window according to the user's preferences.

Figure 2:
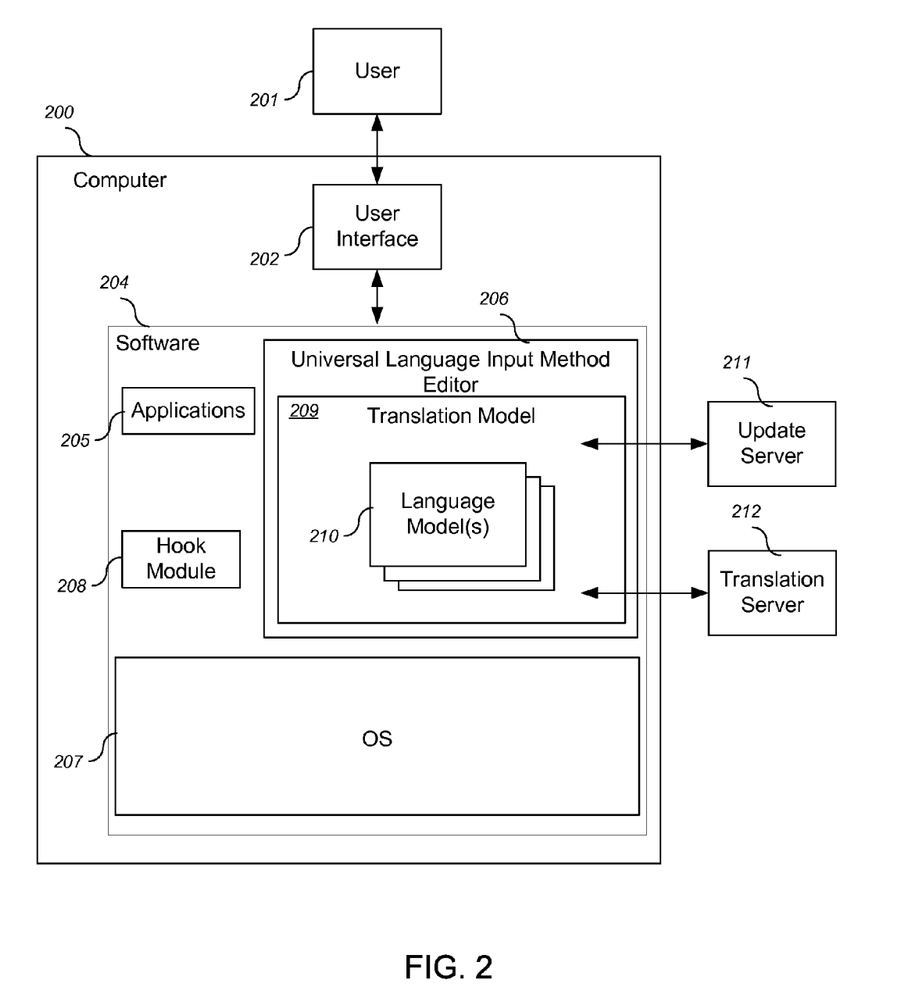
FIG. 2 shows a conceptual block diagram of an example computer system for translating input into an application interface as the input is detected.

FIG. 2 shows a conceptual block diagram of an example computer system 200 for translating input into an application interface as the input is detected. The computer system 200 includes a user interface 202 and software 204. A user 201 can access computer system 200 through the user interface 202. The software 204 includes applications 205, a universal language input method editor 206, and an operating system (OS) 207. The operating system 207 is a particular piece of software that can provide the user interface 202 between the software 204 (e.g., applications 205 and universal language input method editor 206) and the user 201.

The universal language input method editor 206 includes a translation model 209 and one or more language models 210. Alternatively, the translation model 209 can be separate from the universal language input method editor 206. The one or more language models 210 can also be separate from the universal language input method editor 206. For example, the models can be included within software (e.g., software 204) as separate software components, or the models can be located remotely (e.g., the models can be located at remote translation server 212). The language models 210 can further include dictionaries (e.g., Google dictionaries). The software 204 also includes a hook module 208. The hook module 208 can, for example, intercept input to particular applications 205 and send the intercepted input to the universal language input method editor 206. In some implementation, the hook module 208 is a component of the universal language input method editor 206. The system 200 can translate input into an application interface as the input is detected, as described in FIG. 3.

In some implementations, the universal language input method editor 206 uses an update server 211 for updates. The update server 211 can communicate with the computer system 200 to update the software 204. For example, the computer system 200 can use an exported application program interface (API) manager to communicate with an updater application. An updater application downloads updates from the update server 211 and imports the updates (e.g., new phrases for the language models) into the universal language input method editor 206. In particular, the imported phrases are added to dictionaries in the one or more language models 210.

In addition, the update server 211 can be used to download or install the universal language input method editor 206, including translation models (e.g., translation model 209), language models 210, and hook module 208. The update server 211 can also be used to update each of these components. For example, a user can download additional language models that correspond to additional target languages.

In some implementations, the universal language input method editor 206 uses a translation server (e.g., remote translation server 212) to provide the translations for received inputs. For example, the translation server 212 can communicate with the computer system 200 to send translated input to the universal language input method editor 206.

For example, the universal language input method editor 206 can use an exported API manager to communicate with the translation server 212. The translation server 212 includes a translation model and one or more language models for translating an input in a source language to one or more target languages. In some implementations, if the local translation model (e.g., translation model 209) cannot perform a particular translation (e.g., a dictionary of the translation model 209 does not include a particular word or phrase, or the translation model 209 does not include the appropriate language model), then the universal language input method editor 206 uses the translation server 212.

Figure 3:
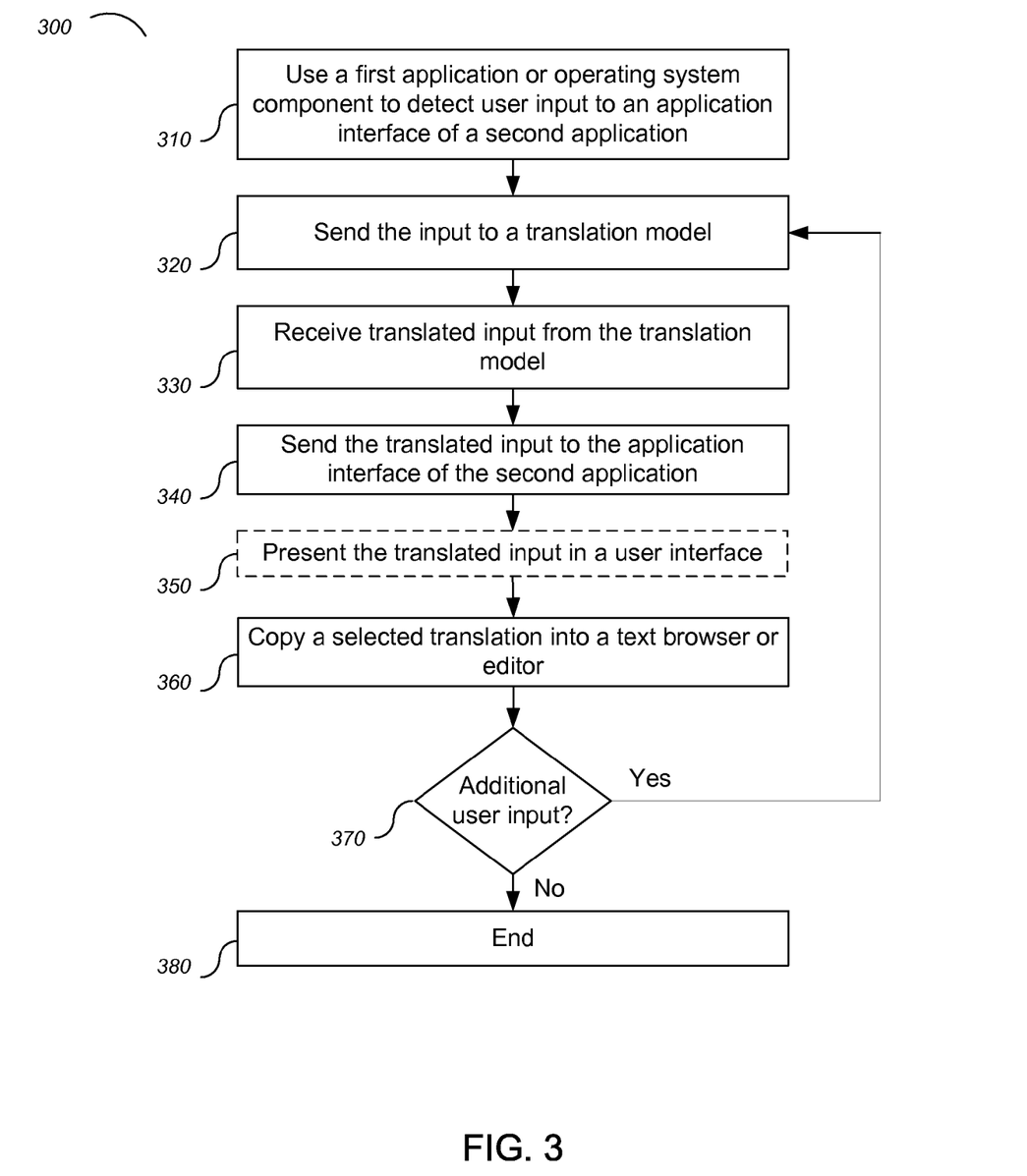
FIG. 3 shows an example process for translating input into an application interface as the input is detected.

FIG. 3 shows an example process 300 for translating input into an application interface as the input is detected. For convenience, translation of input into an application interface as the input is detected will be described with respect to a system that performs the translation. The system uses 310 a first application (e.g., universal language input method editor 206 of FIG. 2) or operating system component (e.g., hook module 208) to detect user input to an application interface of a second application (e.g., application interface 100 of FIG. 1).

The hook module can be included within software (e.g., software 204). In some implementations, the hook module can be part of the universal language input method editor. In some implementations, the hook module is a component installed into the operating system. The universal language input method editor can use the hook module to detect user input to an application interface of a second application.

The hook module (e.g., hook module 208) is applied to hook an interface that can communicate with the operating system (e.g., operating system 207) and one or more applications (e.g., applications 205 and universal language input method editor 206). A hook can allow a user or program to be able to monitor calls to the interface. In particular, the hook module can monitor for system calls or API calls to the interface (e.g., keyboard events received by an event handler, for example, Windows Message Handler).

The hook module can intercept the input and redirect the input to a different software component (e.g., universal language input method editor 206). For example, the hook registers its own address as handler for the event, and allows the system to send 320 the input, as the input is detected, to a translation model (e.g., translation model 209). The translation model uses one or more language models to translate the input into translated input. In some implementations, as described in FIG. 2, the system sends 320 the input to the translation server 212 for translation.

In some implementations, the input includes content being copied from a clipboard. For example, if the user copies the input "hello" from a content source (e.g., a web page) into an application interface (e.g., application interface 100), the system uses the first application or operating system component to detect the input "hello" being copied into the application interface. In some implementations, the input includes incoming input from a remote source (e.g., incoming text representing chat dialogue from other chat participants, and incoming text representing data from web pages).

In some implementations, the first application or operating system component intercepts user input to particular structural elements (e.g., user input area 120 of FIG. 1) of the application interface of the second application (e.g., a chat client application). For example, hook module 208 intercepts user input provided in user input area 120. Alternatively, hook module 208 does not intercept user input provided to, for example, a search field for a help feature of the chat client application.

In some implementations, upon detection of input, the universal language input method editor 206 automatically identifies the input as input to be translated. Furthermore, the universal language input method editor 206 can indicate to a user that the input can be translated. For example, the universal language input method editor 206 can use a visual cue (e.g., highlighting the input, or underlining the input) as an indicator.

One example technique for translating input is statistical machine translation. Statistical machine translation attempts to identify a most probable translation in a target language given a particular input in a source language. For example, when translating a sentence from French to English, statistical machine translation identifies the most probable English sentence given the French sentence. This maximum likelihood translation can be written as:

$$\underset{e}{\mathrm{argmax}} P(e \mid f)$$

which describes the English sentence, e, out of all possible sentences, that provides the highest value for P(e|f). Additionally, Bayes Rule provides that:

$$P(e \mid f) = \frac{P(e)P(f \mid e)}{P(f)}.$$

Using Bayes Rule, this most likely sentence can be re-written as:

$$\underset{e}{\mathrm{argmax}} P(e \mid f) = \underset{e}{\mathrm{argmax}} P(e) P(f \mid e).$$

Consequently, the most likely e (i.e., the most likely English translation) is one that maximizes the product of the probability that e occurs and the probability that e would be translated into f (i.e., the probability that a given English sentence would be translated into the French sentence).

Another example technique identifies all probable translations that have a value for P(e|f) that is greater than a specified threshold amount. This technique allows the system to provide translated input that includes one or more translations of the input.

In some implementations, a user selects one or more of the one or more language models 210. For example, if the user would like to translate input of a first language (e.g., an English word "hello") into a second language (e.g., a Chinese phrase "你好"), the user would select the second language, thereby selecting a language model that corresponds to the second language (e.g., a Chinese language model). As another example, if the user would like to translate input of a first language (e.g., an English word "hello") into a third language (e.g., a Spanish word "hola"), the user could select the third language, thereby selecting a language model that corresponds to the third language (e.g., a Spanish language model).

In some implementations, the system automatically selects one or more of the one or more language models 210. For example, the universal language input method editor 206 can include a context identification module. The context identification module can identify the context of the user input in the second application (e.g., languages used by other chat participants in a web chat, or a geographic region associated with a website or email recipient). For example, if other chat participants are chatting in Chinese, the user is visiting a Chinese website (e.g., www.google.cn), or the user is sending an email to a Chinese email address (e.g., example@gmail.cn), the universal language input method editor 206 can automatically select a Chinese language model from selectable language models.

In some implementations, the translated input includes one or more translations in one or more languages. For example, the user or the system can select two or more language models to be used by the translation model. Alternatively, the system can automatically select two or more language models to be used by the translation model. In particular, if one chat participant in a web chat is typing in Spanish, another chat participant is typing in Chinese, and the user provides input "hello", a Spanish language model and a Chinese language model can be selected, and translated input (e.g., "hola", "嗨", and "你好") can be sent to the application interface of the second application (e.g., translated input area 150 of application interface 100 of FIG. 1).

The system receives 330 translated input from a translation model (e.g., translation model 209; or, in particular situations as described in FIG. 2, a translation model at the remote translation server 212) and sends 340 the translated input to the application interface of the second application (e.g., an application interface of one of the applications 205). For example, the hook module unregisters the hook by calling the original handler (e.g., Windows Message Handler) including sending the translated input to the original handler, which sends 340 the translated input to the application interface of the second application.

In some implementations, the system presents 350 the translated input in a user interface (e.g., user interface 202) for selection. The translated input can include one or more translations of the input to be translated. In some implementations, the user selects one of the one or more translations that are presented in the user interface as a selected translation. In some implementations, the one or more translations are presented in the user interface according to their likelihood of being a correct translation (e.g., presented in a numerical list in order of decreasing likelihood of being the correct translation). The likelihood of being the correct translation can depend, for example, on the context (e.g., previously translated input). In some implementations, the one or more translations are presented in the user interface according to a frequency of the translations occurring in training data.

In some implementations, the translation model 209 automatically selects one of the one or more translations as a selected translation. For example, the one or more language models 210 can include dictionaries that further include relative frequencies of words or phrases occurring in training data. The translation model 209 can automatically select the translation that is most likely to occur (e.g., using statistical machine translation) as the selected translation.

The system copies 360 a selected translation into a text browser or editor of the second application, and continues to monitor 370 for additional user input. If the system detects additional user input ("Yes" branch of step 370), then the system performs steps including 320, 330, 340, and optionally 350, 360, and 370. Otherwise, the process ends 380.

In some implementations, the hook module does not unregister the hook until a user exits the second application or the second application is no longer in user focus (e.g., the user switches focus to a third application, or the user minimizes the second application in a graphical user interface). In some implementations, the hook module does not unregister the hook until the user manually disables (e.g., exits) the first application. Furthermore, in some implementations, the hook module automatically re-hooks the interface that can communicate with the operating system and the one or more applications when the second application is brought back into user focus, or if the user reinitiates the second application.

For example, a user initially provides the English characters "water" as input. As the system detects the input, the input is sent to the translation model. Chinese character "水", which means water, is received as translated input from the translation model, and sent to the application interface of the second application. Furthermore, as the user continues to provide input, the original sequence of English characters "water" input can become a sequence of English characters "waterfall". As the system detects the input (e.g., each character entered), the input is sent to the translation model for translation. For example, after the user types the last character "l", the system can automatically send "瀑布", which means "waterfall", to the application interface of the second application. In some implementations, the universal language input method editor 206 provides predictive translations. For example, after the user types the character "f", the system can automatically send "瀑布"; "水禽", which means "waterfowl"; and "海滨", which means "waterfront", to the application interface of the second application. After the user types the character "a", the system automatically sends "瀑布".

As shown in FIGS. 1 and 2, for example, a user can type "hello" in the application interface 100 (e.g., Google Talk client application interface or other chat or messaging application interface). In a computer system running a Windows operating system, a keyboard event including the input "hello" is sent to a Win32 API. In particular, the Windows Message Handler can process the keyboard event. The universal language input method editor 206 can, however, use the hook module 208 to hook the Win32 API, intercept the input, and send the input to the translation model 209.

The translation model 209 uses one of one or more language models (e.g., a Chinese translation model) to translate the input, and sends the translated input to the Windows Message Handler. The Windows Message Handler sends the translated input to the application interface 100. Optionally, the universal language input method editor 206 can present the translated input in the user interface (e.g., the translation window 130 including the translated input 155) for user selection.

The system then copies a selected translation (e.g., Chinese phrase "你好" or Chinese word "嗨") into a text browser or editor (e.g., user input area 120). For example, "你好" can be copied into user input area 120 to replace "hello". Alternatively, "嗨" can be copied into user input area 120 to replace "hello". The universal language input method editor 206 can continue to monitor 370 for additional user input (e.g., additional input provided in the user input area 120).

Figure 4:
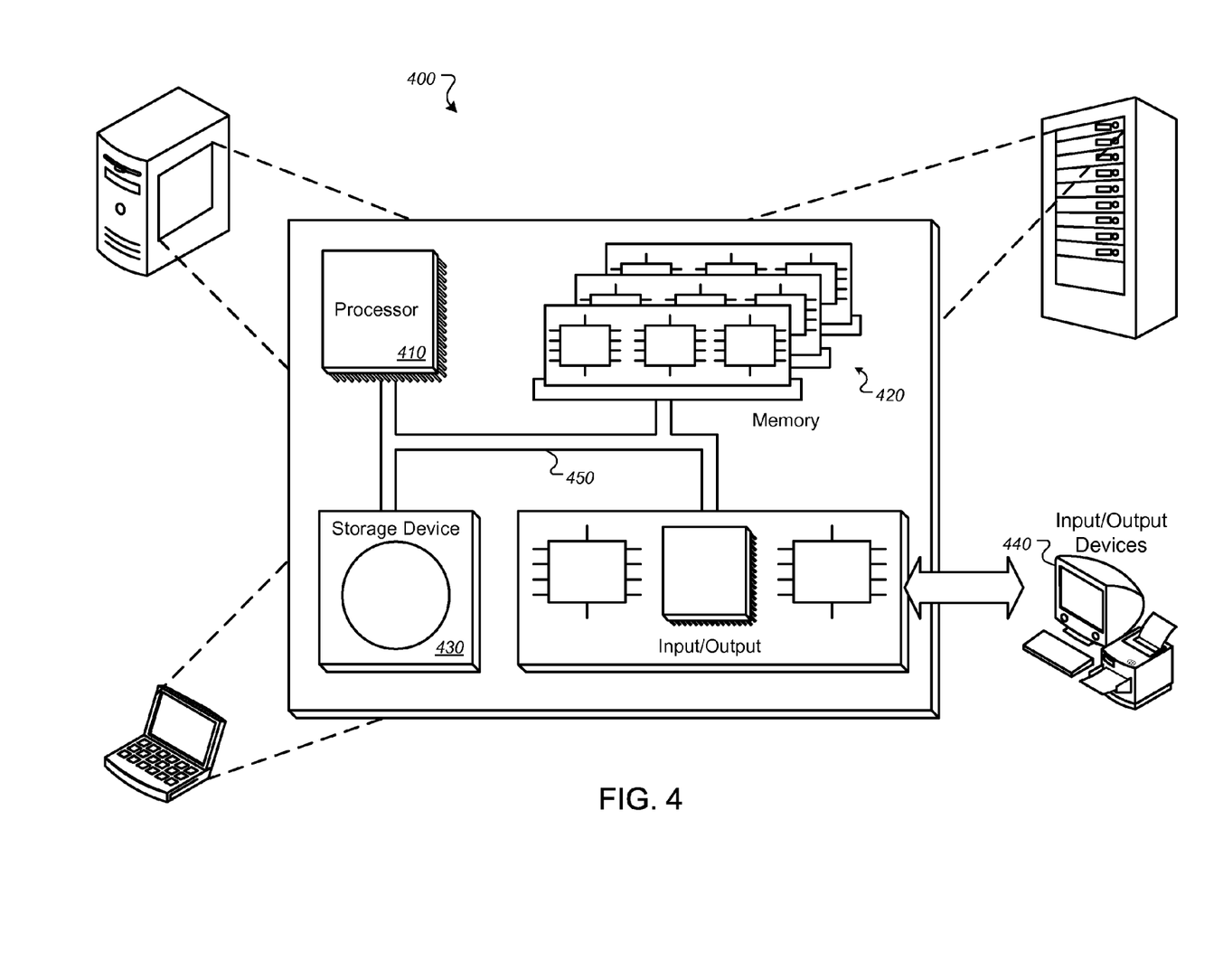
FIG. 4 is a schematic diagram of a generic computer system.

FIG. 4 is a schematic diagram of a generic computer system 400. The system 400 can be used for practicing operations described in association with a universal language input method editor 206. The system 400 can include a processor 410, a memory 420, a storage device 430, and input/output devices 440. Each of the components 410, 420, 430, and 440 are interconnected using a system bus 450. The processor 410 is capable of processing instructions for execution within the system 400. Such executed instructions can implement one or more components, for example, of the universal language input method editor 206. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface (e.g., user interface 202) on the input/output device 440.

The memory 420 is a computer readable medium such as volatile or non volatile that stores information within the system 400. The memory 420 could store the universal language input method editor 206, for example. The storage device 430 is capable of providing persistent storage for the system 400. The storage device 430 may be a floppy disk device, a hard disk device, an optical disk device, or a tape device, or other suitable persistent storage means. The input/output device 440 provides input/output operations for the system 400. In one implementation, the input/output device 440 includes a keyboard and/or pointing device. In another implementation, the input/output device 440 includes a display unit for displaying graphical user interfaces.

The input/output device 440 can provide input/output operations for a universal language input method editor 206. The universal language input method editor 206 can detect user input and send translated input to applications such as, for example, chat applications (e.g., chat window 100), text editor or browser applications (e.g., word processors, email applications, or web browsers), translation applications or other applications that can use translated input (e.g., gaming applications that include chat features). The universal language input method editor 206 can include components such as a translation model 209 and one or more language models 210. The universal language input method editor 206 can also use servers for updates and translations. Examples of such components include an update server 211 and a translation server 212. Such components 209, 210, 211, and 212 can be persisted in storage device 430, memory 420 or can be obtained over a network connection, to name a few examples.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
automatically detecting, at a computing system including one or more processors, input by a user to a first application executing on the computing system, the input consisting of text to be translated from a source language to a target language that is different than the source language;
intercepting, at the computing system, the input to the first application in response to automatically detecting the input;
redirecting, at the computing system, the input to a second application executing on the computing system, the second application being different than the first application;
generating, at the computing system, one or more potential translations of the input using the second application, each of the one or more potential translations of the input being of the target language;
determining, at the computing system, one of the one or more potential translations of the input to obtain a translated input; and
providing, at the computing system, the translated input to the first application,
wherein intercepting the input to the first application includes intercepting a call via an interface, the interface being between the first application and an operating system of the computing system, the call being one of a system call and an application programming interface (API) call,
wherein intercepting the call from the first application to the operating system further includes:
applying, at the computing system, a hook to the interface between the first application and the operating system, and
determining, at the computing system, the call by monitoring the interface between the first application and the operating system using the hook,
wherein applying the hook to the interface between the first application and the operating system further includes registering, at the computing system, an address of the hook as an event handler,
wherein providing the translated input to the first application further includes:
unregistering, at the computing system, the address of the hook as an event handler by calling an original event handler, and
transmitting, at the computing system, the translated input to the original handler, wherein the original event handler is configured to transmit the translated input to an application interface of the first application, and
wherein unregistering the address of the hook is performed when the user manually disables the first application or when the user changes their focus to a different application, and further comprising re-registering, at the computing system, the address of the hook as an event handler when the address of the hook has been unregistered and the user changes their focus back to the first application.

2. A computing system comprising one or more processors and a user interface, the one or more processors configured to execute a method of:
automatically detecting input by a user via the user interface to a first application executing on the computing system, the input consisting of text to be translated from a source language to a target language that is different than the source language;
intercepting the input in response to automatically detecting the input;
redirecting the input to a second application executing on the computing system, the second application being different than the first application;
generating one or more potential translations of the input using the second application, each of the one or more potential translations of the input being of the target language;
determining one of the one or more potential translations to obtain a translated input; and
providing the translated input to the first application,
wherein intercepting the input to the first application includes intercepting a call via an interface, the interface being between the first application and an operating system of the computing system, the call being one of a system call and an application programming interface (API) call,
wherein intercepting the call from the first application to the operating system further includes:
applying a hook to the interface between the first application and the operating system, and
determining the call by monitoring the interface between the first application and the operating system using the hook,
wherein applying the hook to the interface between the first application and the operating system further includes registering an address of the hook as an event handler,
wherein providing the translated input to the first application further includes:
unregistering the address of the hook as an event handler by calling an original event handler, and
transmitting the translated input to the original handler, wherein the original event handler is configured to transmit the translated input to an application interface of the first application, and
wherein unregistering the address of the hook is performed when the user manually disables the first application or when the user changes their focus to a different application, and further comprising re-registering, at the computing system, the address of the hook as an event handler when the address of the hook has been unregistered and the user changes their focus back to the first application.

* * * * *